United States Patent
Defontenay et al.

[11] 3,732,741
[45] May 15, 1973

[54] DEVICES FOR CONTROLLING THE CARRIAGE OF A PORTABLE SHEAR

[75] Inventors: Paul Defontenay, Bourg-la-Reine; Ian John Lewis, Les Lilas, both of France

[73] Assignees: Societe Anonyme dite: Wean Damiron, Paris; Redex, Val de Marne, France

[22] Filed: June 2, 1971

[21] Appl. No.: 149,148

[30] Foreign Application Priority Data

June 5, 1970 France..................................7020827

[52] U.S. Cl. ..........................74/55, 83/299, 83/318, 74/388
[51] Int. Cl...............................................F16h 25/08
[58] Field of Search ..................83/299, 318; 74/388, 74/55; 226/58, 59, 60

[56] References Cited

UNITED STATES PATENTS

| 3,048,050 | 8/1962 | Perryman | 74/388 |
| 2,850,092 | 9/1958 | Teplitz | 83/299 |
| 3,298,266 | 1/1967 | Molnar | 83/318 |
| 2,415,157 | 2/1947 | Bedford | 74/388 |
| 2,258,816 | 10/1941 | Shields | 83/299 |

*Primary Examiner*—Charles J. Myhre
*Assistant Examiner*—Wesley S. Ratliff, Jr.
*Attorney*—Bucknam & Archer

[57] ABSTRACT

This invention relates to a device for controlling the carriage of a portable shear, wherein it is actuated by a double-action jack fed by a hydraulic assembly piloted by a gap detector between the carriage and a movement simulator composed of a movable member, the displacement of which parallel to the carriage is controlled by a cam driven by means of a differential on which means enable the rotation of the cam to be braked or accelerated.

5 Claims, 1 Drawing Figure

PATENTED MAY 15 1973　　　　　　　　　　　　　　　3,732,741
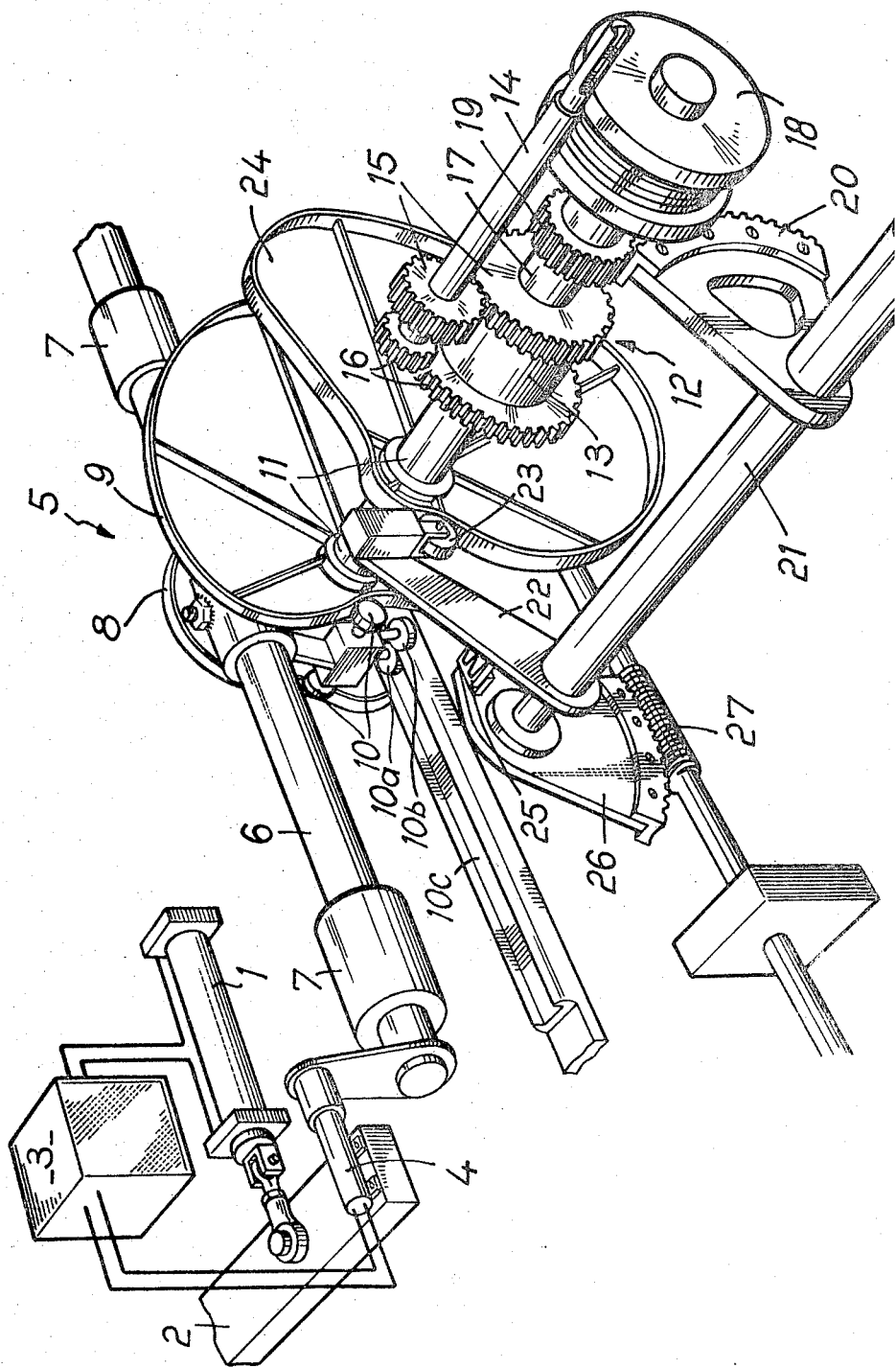

DEVICES FOR CONTROLLING THE CARRIAGE OF A PORTABLE SHEAR

The present invention relates to a device for controlling the carriage of a portable shear.

In a portable shear, the cutter is mounted on a carriage which is advanced in synchronism with the sheet of metal to be cut in order to enable the cutter to operate correctly on the moving sheet.

In general, the return of the carriage to its initial position is effected at a constant speed, thus in a determined period of time, and the carriage must therefore be started at the moment of each cut and at different moments according to the length of sheet metal to be cut, these startings and variable durations of stopping require a costly and not very sure regulation equipment.

The aim of the invention is to give the carriage a continuous movement without stopping time, the adjustable duration of the return of the carriage enabling sheet metal to be cut to different lengths.

The invention therefore has for its object a device for controlling the carriage of a portable shear, characterized in that it is actuated by a double-action jack fed by a hydraulic assembly piloted by a gap detector between the carriage and a movement simulator composed of a movable member, the movement of which, parallel to the carriage, is controlled by a cam driven by means of a differential on which means enable the rotation of the cam to be braked or accelerated.

The invention will be more readily understood with reference to the accompanying drawings, in which:

The single FIGURE is a schematic perspective view of a device according to the invention.

Referring to the drawings, the device according to the invention for controlling the carriage of a portable shear comprises a double-action jack 1 which actuates the carriage 2. This jack is fed by means of a hydraulic assembly 3 piloted by a gap detector 4 fixed to the carriage, the sensitive element of which is connected to a device 5 simulating the movement of the carriage.

This simulator is composed of a shaft 6 movable parallel to the displacement of the carriage. This shaft 6 which slides in bearings 7 is controlled by two cams 8 and 9 acting on two rollers 10 integral with the shaft 6 along which one of the rollers 10a or 10b is located in the guide groove 10c.

A hydraulic device (not shown) ensures the application of the roller 10 on its cam.

The cams 8 or 9 determine the length of cut.

These cams are mounted on a first driven shaft 11 of a differential 12 whose cage 13 is driven by a driving shaft 14 thanks to sets of pinions 15 and 16 enabling two speed ratios to be had according to whether the cam 8 or 9 is engaged with rollers 10. The second driven shaft 17 is coupled by a clutch brake unit 18 to a pinion 19 engaged with a toothed sector 20 mounted on an axis 21 of rotation, which receives its rotational movement due to an arm 22 provided with a roller 23 coming into contact with a cam 24 mounted on the shaft 11, a device (not shown) tending to apply the roller 23 to the cam 24.

The movement of approach of the arm 22 towards the cam 24 is limited by an adjustable stop 25 which is mounted on a toothed sector 26 engaged with an endless screw 27.

The operation of the device is as follows: In the advance phase of the carriage, the brake 18 is locked and the shaft 14 directly drives the shaft 11 and consequently cams 8 and 9 which displace the shaft 6 at a speed equal to that of the sheet metal to be cut. The gap detector then ensures a feed of the jack 1 which displaces the carriage at the same speed as the sheet.

When the sheet has been cut, the return device returns the shaft 6 backwards and consequently the carriage 2 in synchronism. During the backward return, the sheet metal continues to advance and, according to the speed of return, a more or less long length of metal will pass beneath the carriage.

In order to regulate this return speed, the clutch-brake unit 18 is unlocked and couples the pinion 19 and the toothed sector 20, the cam 24 acting on the arm 22 causes the sector 20 to rotate, driving shaft 17, this decelerating the speed of the shaft 11, i.e. the return speed of the carriage.

The stop 25, by modifying the moment when the roller 23 comes into contact with the cam 24, enables the moment of the deceleration of the return to be selected, i.e. the duration of the return to be modified.

During the advance, the clutch uncouples the pinion in order to enable the sector 20 to return into stop position.

What is claimed is:

1. A device for controlling the carriage of a portable shear which comprises a double-action jack, hydraulic means for actuating said jack, a gap detector fixed on to the carriage, a movement simulator connected to said gap detector, said simulator comprising a member movable back and forth in the direction parallel to the carriage, camming means for controlling the motion of said movable member, said camming means displacing said movable member at a speed equal to the speed of the material to be cut during the forward motion of the carriage, a differential for synchronizing the speed of said movable member to the speed of the material being cut; means for driving said differential which comprises a planetary cage, angular means for controlling the planetary cage during the return movement of said first movable member and a clutch brake unit, the speed of said first movable member and said carriage during the return motion being adjusted to the length of the material being cut, the duration of the return being adjustable to the length of the material being cut.

2. The device according to claim 1, wherein said angular means comprise a toothed sector engaged with a driving pinion of said clutch.

3. The device according to claim 2, wherein said toothed sector is controlled by camming means mounted on a shaft of said differential.

4. The device according to claim 1, wherein said camming means for controlling the motion of said movable member are two cams of different size, and one or the other is engaged according to the desired length of the material to be cut.

5. The device according to claim 1 which comprises a stop to control the duration of the return motion.

* * * * *